Aug. 4, 1970  J. S. MELLOTT ET AL  3,522,880
METHOD AND APPARATUS FOR CONVEYING AND SORTING ELONGATED ARTICLES
Filed July 16, 1968  3 Sheets-Sheet 1
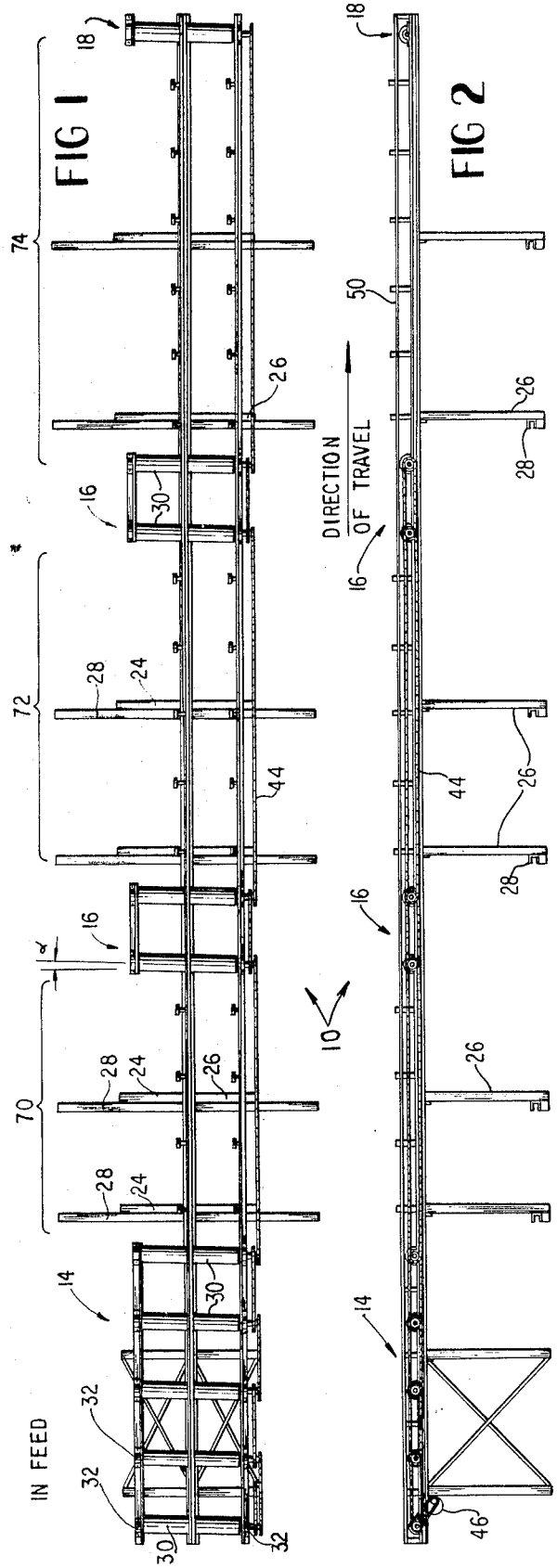
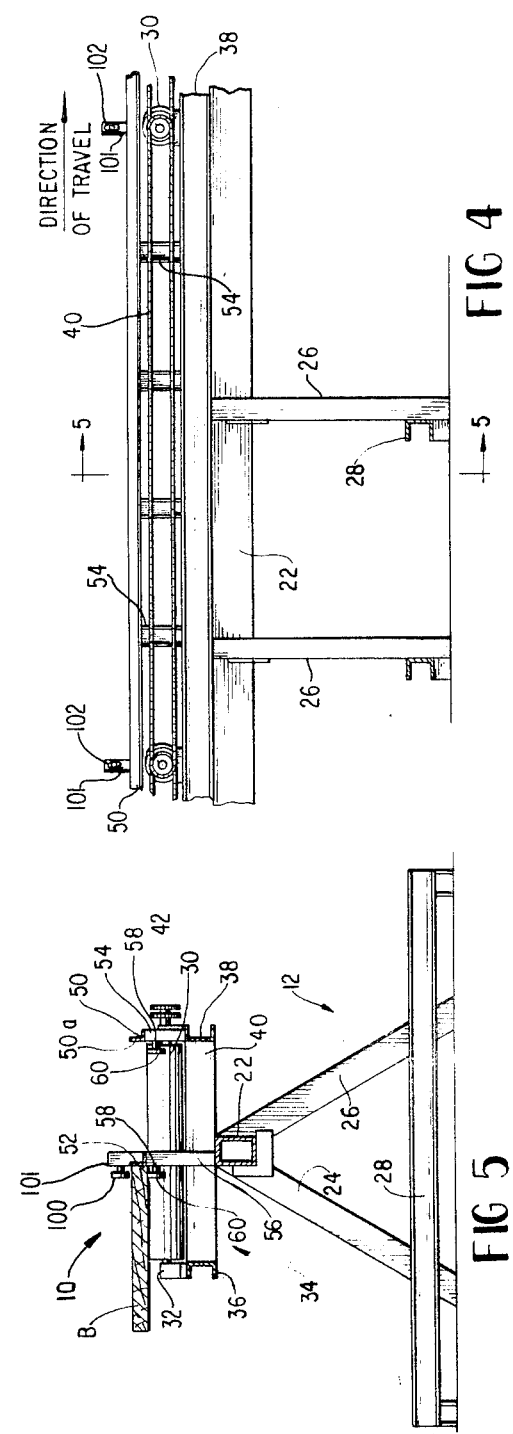
INVENTORS
JOHN S. MELLOTT.
HAYES R. MELLOTT.
BY Browne, Schuyler & Beveridge
ATTORNEYS

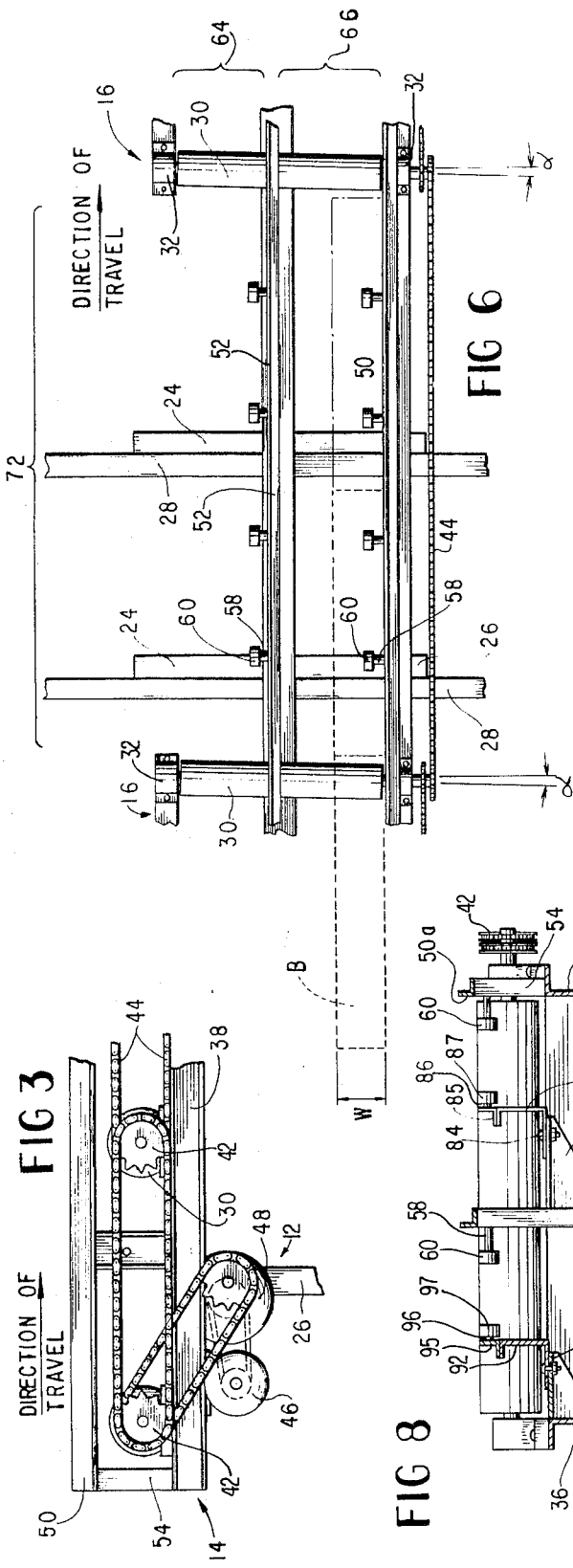

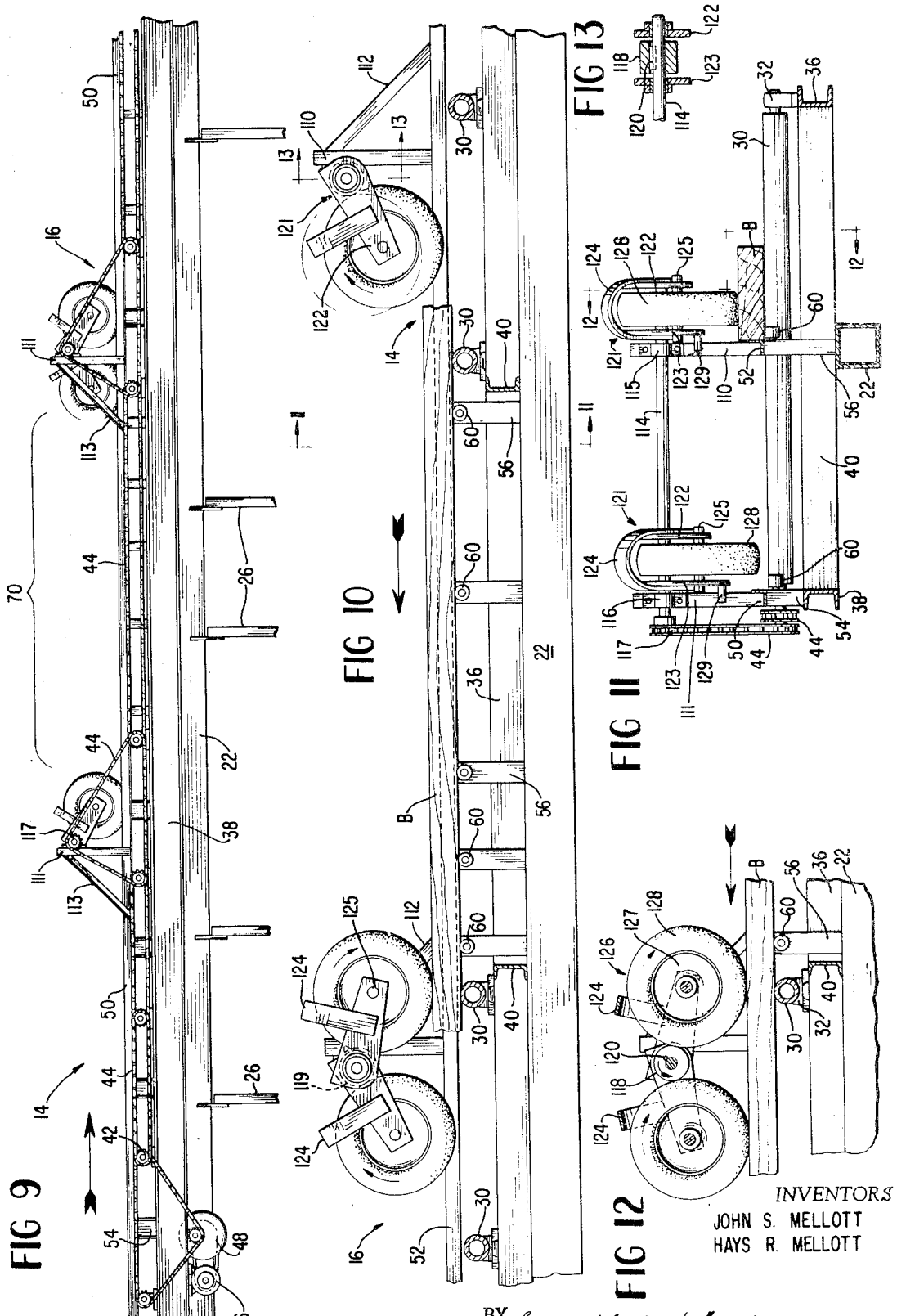

United States Patent Office 3,522,880
Patented Aug. 4, 1970

---

3,522,880
METHOD AND APPARATUS FOR CONVEYING AND SORTING ELONGATED ARTICLES
John S. Mellott and Hayes R. Mellott, both of Rte. 1, Box 97, Mercersburg, Pa. 17236
Filed July 16, 1968, Ser. No. 745,271
Int. Cl. B07b 13/04
U.S. Cl. 209—73      26 Claims

ABSTRACT OF THE DISCLOSURE

A method of, and apparatus for, sorting elongated articles according to length by conveying successive articles to be sorted lengthwise along a conveyer path defined by a plurality of spaced, longitudinally aligned conveyer segments. The articles are conveyed in edge alignment with guide means on the conveyer segments, and are supported along their bottom surface adjacent one side edge between successive conveyer segments.

---

This invention relates to an improved method and apparatus for sorting elongated articles, and more particularly to an improved method and apparatus for sorting elongated articles such as boards of lumber by length and width as the articles are conveyed along a horizontal conveyer path. While the invention is useful in conveying and sorting various elongated articles, it is particularly well adopted for sorting lumber and will be described herein with reference to a lumber sorting mechanism.

In the past, numerous devices have been developed for sorting elongated, generally rectangular articles such as boards of lumber in accordance with their length and/or width. However, these devices have not been entirely satisfactory for various reasons, with the result that much of the sorting of lumber is still done manually. For example, the known sorting devices have generally been susceptible to jamming, and have been relatively complex mechanisms which require excessive maintenance. Further, many of the known devices have depended upon conveying the articles in a direction transverse to their longitudinal dimension and have therefore required complicated loading mechanisms and have occupied excessive space at the point of installation.

Accordingly, it is the primary object of the present invention to provide an improved method of and apparatus for automatically sorting articles according to length and/or width as the articles are conveyed lengthwise along the conveyer path.

Another object is to provide such a sorting apparatus which will automatically and reliably sort such articles both as to length and width in a continuous operation.

Another object of the invention is to provide such an apparatus which requires a minimum of space, and which is both inexpensive to build and economical to maintain and to operate.

Another object of the invention is to provide an improved lumber sorting device for automatically sorting lumber according to the length of the individual boards as they are moving lengthwise on a conveyer, and which does not require the actuation of a mechanical or other device to remove the sorted length from the conveyer.

Another object of the invention is to provide such a sorter which requires no special loading mechanisms.

The foregoing and other objects are attained in a lumber sorter according to this invention in which a power driven roller conveyer is provided for conveying individual boards of lumber lengthwise along a longitudinal conveyer path, with the conveyer being made up of a plurality of individual conveyer segments mounted in longitudinally aligned, spaced relation with respect to one another. The spacing between successive conveyer segments corresponds to the minimum length of board which can be conveyed between the successive segments, with this conveyer segment spacing increasing progressively between the infeed and discharge ends of the conveyer so that the shorter boards are sorted out first, with boards of increasing length being sorted out as they proceed along the length of the conveyer. The rollers of the conveyer segments are inclined slightly with respect to the longitudinal axis of the conveyer path so that boards being conveyed tend to run toward one side of the conveyer into side-edge engagement with a side guide extending along the length of the conveyer. A plurality of short idler rollers, such as anti-friction bearings mounted for free rotation on cantilevered stub shafts, are mounted along the side guide between the successive conveyer segments so that, as a length of board passes between two adjacent conveyer segments, the bottom surface of the board is supported along one side edge by the idler rollers. Thus, any board having a length sufficient to span the spacing between two successive conveyer segments will be continuously supported by the short rollers and either the last roller of the conveyer segment over which the board is passing, or the first roller of the next successive conveyer segment. However, any board having a length insufficient to span the space between the successive conveyer segments will drop by the action of gravity since the short rollers do not project beneath the board a distance sufficient to prevent the board from falling in the absence of additional support from at least one of the conveyer segments.

To adapt the sorting mechanism to sort for width as well as length, a second set of idler rollers are supported in laterally spaced relation to the first set of rollers, with the spacing being such as to permit a board of a width less than a predetermined minimum to drop therebetween, but to prevent boards of greater than such predetermined minimum from dropping out. The lateral spacing of the two sets of idler rollers is progressively increased between successive conveyer segments so that boards of increasing width are dropped out as they progress along the length of the conveyer.

Other objects and advantages of the invention will become apparent from the following detailed description taken with the drawings, in which:

FIG. 1 is a top plan view of a conveyer and sorter according to the present invention;

FIG. 2 is a side elevation view of the conveyer and sorter shown in FIG. 1;

FIG. 3 is an enlarged fragmentary view of a portion of the mechanism shown in FIG. 1, and illustrating the arrangement for driving the conveyer segments;

FIG. 4 is an enlarged plan view of a portion of the conveyer shown in FIG. 2;

FIG. 5 is a sectional view taken on line 5—5 of FIG. 4;

FIG. 6 is an enlarged plan view of a portion of the conveyer shown in FIG. 1;

FIG. 7 is an enlarged fragmentary plan view similar to FIG. 6 and illustrating an alternate embodiment of the invention;

FIG. 8 is a fragmentary sectional view taken on line 8—8 of FIG. 7;

FIG. 9 is a fragmentary elevation view illustrating an alternate embodiment of the invention;

FIG. 10 is an enlarged fragmentary view, in elevation, showing the opposite side of a portion of the structure shown in FIG. 9;

FIG. 11 is a sectional view taken on line 11—11 of FIG. 10;

FIG. 12 is a fragmentary sectional view taken on line 12—12 of FIG. 11; and

FIG. 13 is a fragmentary sectional view taken on line 13—13 of FIG. 11.

Referring now to the drawings in detail, a lumber conveyor and sorter according to the present invention is indicated generally by the reference numeral 10 and includes a frame 12 supporting an infeed driven roller conveyor segment 14, a plurality of intermediate driven roller conveyor segments 16, and a discharge driven roller conveyor segment 18. The frame 12 is made up of an elongated hollow tubular structural beam member 22 supported at the top of a plurality of A-frame members each having a pair of inclined legs 24, 26 and a transversely extending base member 28. The individual conveyor segments 14, 16 and 18 are supported on the beam 22, as illustrated in FIG. 5, with the conveyor segments projecting laterally beyond the sides of the beam to overhang the inclined legs 24, 26.

It is pointed out that the conveying and sorting apparatus may comprise as many intermediate conveyor segments 16 as necessary or desirable to sort the lumber into the various widths and lengths in the manner to be more fully described hereinbelow. The various conveyor segments are similar in construction except that the infeed conveyor segment 14 may be substantially longer than the intermediate and discharge segments, and the discharge segment may consist of a single driven roller, if desired, as illustrated in FIG. 1. Since the individual conveyor segments are similar in construction, except for their length, only one will be described in detail, and identical reference numerals will be employed to identify similar elements of the various conveyor segments.

The conveyor segment 14 comprises a plurality of conventional cylindrical roller conveyor elements 30 each having their ends journalled for rotation by self-aligning anti-friction bearings 32 rigidly mounted on a rectangular frame 34. The frame 34 comprises a pair of opposed structural channel members 36, 38 rigidly supported in spaced parallel relation by transverse structural members 40. The transverse structural members 40 are rigidly secured, as by bolts, or welding, to the upper surface of the tubular beam 22. Preferably, the channel 38 extends the full length of the conveying and sorting mechanism so that it spans the space between successive conveyor segments.

The individual roller elements 30 each have a pair of sprockets 42 mounted on one end thereof outboard of the bearings 32, and a plurality of endless chains 44 extend over the sprockets 42 between adjacent rollers 30 to drive the rollers for rotation about their respective axes. A suitable electric motor 46 and reduction gear 48 is provided to supply power to the conveyor.

As illustrated in FIG. 1, the respective roller elements 30 are mounted for rotation about parallel axes which are inclined slightly with respect to the longitudinal axis of the channels 36, 38, the angle of inclination α being indicated in FIG. 1 in the plane of the load carrying surface defined by the upper portion of the rollers. Thus, rotation of the rollers 30 in a clockwise direction, as viewed in FIG. 2, to convey a board from the infeed conveyor segment 14 toward the discharge conveyor segment 18 would result in the board being urged toward the right side of the conveyor, as viewed from the infeed end.

A pair of structural angles 50, 52 are supported one adjacent the right end of the rollers 30, again viewed from the infeed end of the conveyor, and the other at approximately the mid-point of the rollers vertically above the beam 22. The structural angles extend the full length of the conveyor, and have their lower surfaces positioned closely adjacent the plane of the conveyor surface defined by the rollers 30. Thus, the angles 50, 52 divide the conveying surface into left and right conveyor paths 64, 66, respectively, as indicated in FIGS. 6 and 7. The angles 50, 52, respectively, form a side-edge guide along the right side of the two conveying paths to engage and guide the side-edge of boards moving along the respective conveying paths. The angles of the conveying rollers 30 will automatically urge the board into contact with the side guides so that successive boards are conveyed in close side-edge alignment. Since the channel member 38 extends the full length of the conveyor path, in spaced parallel relation to the structural beam 22, the angle 50 may be supported thereon by a plurality of bracket members 54 mounted, as by welding, on the upper surface of the channel. Similarly, the angle 52 is mounted by a plurality of vertically extending bracket members 56 rigidly supported, as by welding, to the upper surface of the beam 22.

A plurality of stub shafts 58 are mounted at spaced intervals along the conveyor paths on the rigid brackets 54 and 56 between adjacent conveyor segments, with the stub shafts 58 being rigidly supported on their respective supporting brackets and projecting inwardly from the inner vertical guide surface 50a and 52a of the angles 50 and 52, respectively. A plurality of idler rollers 60 are mounted, one on each of the stub shafts 58, for rotation about axes extending in a substantially transverse direction with respect to the conveyor paths, and generally parallel to the axes of rollers 30. The idler rollers 60 have their upper surface in the plane of the upper portion of the rollers 30 and cooperate therewith to define the longitudinal conveying path of the apparatus. Idler rollers 60 may be conventional anti-friction roller or ball bearings or simple wheels molded of a low friction plastic material such as nylon or Teflon so that they offer little frictional resistance to rotation about their respective mounting shafts 58.

The stub shafts 58 are relatively short as compared to the transverse dimension of the conveyor paths, with the transverse dimension between the guide surfaces 50a and 52a and the associated rollers 60 between any two successive conveyer segments being less than one-half the minimum transverse width of the boards to be sorted out by the apparatus between those two conveyor segments.

From the above, it is believed apparent that a board B of any arbitrary width W (see FIG. 6) which is positioned on the infeed conveyer segment 14, on either the left or right conveyer path, will be conveyed longitudinally along the length of the conveying and sorting apparatus. Assuming the board B to be placed on the left path 64, the angle of the roller elements 30 will move the board B into edge-engagement with the side guide 52 (see FIG. 5) as the board moves along the length of conveyer segment 14. As the leading end of the board B moves beyond the infeed conveyer segment 14, the bottom surface of the board will be supported on the idler rollers 60. Assuming that the board has a length greater than the longitudinal spacing between infeed conveyer segment 14 and the first intermediate conveyer segment 16, the board will be continuously supported, first by the rollers 30 of in feed conveyer segment 14 and the idler rollers 60, and subsequently by the rollers 60 and the individual rollers 30 of the intermediate conveyer segment 16, and the board will be conveyed past the first sorter station 70. Similarly, as the board passes from the first intermediate conveyer 16, it will be supported by the rollers 30 thereof and the idler rollers 60 between the first and second intermediate conveyer segments. If the length of the board B is insufficient to completely span the space between the first and second intermediate conveyer segments 16, as illustrated in FIG. 6, then the board will drop, by the action of gravity, through the space between the first and second intermediate conveyer segments at the second sorter station 72. Since the width W of the board B is greater than twice the distance between the idler rollers 60 and the guide edge 52a of angle 52, the board B will automatically drop out as soon as it reaches a position where it receives no vertical support from a driven conveyer roller element 30. Thus, the length of the respective sorter stations 70, 72 and 74 illustrated in FIG. 1 are progressively longer, from the infeed end of the conveyer, so that the shorter boards are sorted out first, with intermediate length dropping out at subsequent sorter stations, and the longest boards being conveyed over the end of the discharge conveyer 18.

As most clearly seen in FIG. 5, when a board drops out at one of the sorter stations, it falls onto the inclined surface of the legs 24 or 26 and guides downwardly therealong to come to rest on the horizontal base members 28. When a sufficient number of board of a particular length are collected on the base members 28 at a particular station, they may be removed by any convenient means such as a forklift or the like.

Referring now to FIGS. 4 and 5, it is seen that the device can be employed to sort boards according to length, regardless of the width of the boards and regardless of the length of the rollers 30. To accomplish this, a wide board, i.e., one having a width substantially greater than one-half of the total length of the roller 30, is positioned on the right side of the apparatus, as viewed from the infeed end. Thus, the board can have one longitudinal edge bearing against the side guide 52a and its other side cantilevered over the side of the conveyer mechanism. A holddown idler roller 100 is rotatably supported on a bracket 101 rigidly mounted, as by welding, one side guide angle 52, with a roller 100 being positioned vertically above each of the end rollers of each conveyer segment. Rollers 100 are preferably mounted in elongated slots 102 in brackets 101 and are vertically adjustable to engage the upper surface of boards of variable thicknesses.

Referring now to the embodiment of the invention shown in FIGS. 7 and 8, it is seen that the sorter mechanism can readily be adapted to sort lumber according to width as well as length. To this end, a pair of brackets 80, 81 are rigidly mounted on the beam 22 between adjacent conveyer segments, one adjacent the end roller 30 of each segment, with the brackets projecting transversely of the conveyer path in the direction of channel 38. A pair of brackets 82, 83 are adjustably supported, as by bolts 84, on the brackets 80, 81, respectively, and an elongated structural angle 85 is rigidly mounted on the brackets 82, 83. The structural angle 85 extends longitudinally of the conveyer path parallel to guide angles 50, 52, and is positioned slightly beneath the conveying surface defined by the upper portion of the rollers 30. A plurality of stub axles 86 are mounted on the structural angle 85 at spaced intervals therealong, and an idler roller 87 is rotatably mounted on each of the stub axles 86. The brackets 82, 83 are adjustable transversely of the conveyer path to position the rollers 87 laterally with respect to the rollers 60 and with respect to the guide surface 50a. Thus, the upper surface of guide rollers 87 and 60 cooperate to define a supporting surface for boards of greater than a predetermined minimum width which are transported between conveyer segments.

The spacing between the guide surface 50a and the idler roller 87 corresponds to the maximum width of board which can be sorted out at a particular sorting station. For example, again assume that a board B is moving on the conveyer between the conveyer segment 14 and 16, in FIG. 7, with the board having a length less than the distance between the conveyer segments. Such a board will be permitted to drop out only if its width is less than the space between the guide surface 50a and the rollers 87. If this board width is sufficient to extend over and rest on the rollers 87, then it will not be permitted to drop out and will pass on to the next sorting station where the lateral spacing between the guide surface 50a and the rollers 87 is increased.

To adapt both the left and right conveyer paths of the conveying and sorting mechanism to sort by width, a second set of brackets 90, 91 are rigidly mounted on the channels 36 between adjacent conveyer segments. Brackets 90, 91 project transversely of the conveyer path, and a second pair of brackets 92, 93 respectively are adjustably supported thereon, as by bolts 84. A second structural angle 95 is mounted on the brackets 92, 93, and a plurality of stub shafts 96 each supporting a idler roller 97, are mounted on the structural angle 95.

It is believed apparent that when the above described structure is employed to sort lumber by width, it is necessary to have a separate sorting station for each width of board to be sorted, with the second set of idler rollers being adjusted transversely of the conveyer path as necessary to sort the desired width of board at each station. Further, if the apparatus is employed to sort according to both length and width simultaneously, then it is necessary to have a plurality of sorter stations adapted to sort boards of each particular length, with the separate sorter stations for each length of board being adapted to sort out progressively wider boards as the boards move along the length of the conveyer.

While the structure illustrated in FIGS. 7 and 8 cannot be employed to sort articles such as beams, having a high thickness-to-width ratio, due to a tendency of such articles to wedge between the rollers, it is believed apparent that the embodiment of the invention illustrated in FIGS. 1 through 6 of the drawings may be employed to sort lumber according to width, within limits, regardless of the thickness-to-width ratio. This is accomplished by providing idler rollers 60 at each sorter station within a definite length so as to provide support for a board of a predetermined minimum width, but insufficient to support a board of greater width. In this arrangement, the wider boards would be sorted out first, with progressively more narrow boards being sorted out at successive sorting stations along the length of the conveyer, it only being necessary to provide a shorter idler roller at successive stations along the conveyer.

Referring now to FIGS. 9 through 13, an alternate embodiment of the invention will be described in detail. In this embodiment, the basic conveying and sorting mechanism is identical to that shown in FIGS. 1–3 of the drawings, with this alternate embodiment differing therefrom only by the addition of means for engaging the upper surface of the boards being conveyed on the mechanism to assure continuous smooth movement of the board along the conveying path. Thus, the description of this embodiment, only the modifications will be described in detail, with the reference numerals employed to identify various components of the basic structure remaining uniform throughout the various views of the drawings.

Each of the conveyer segments are provided with an upwardly extending A frame assembly comprising a pair of vertical structural members 110, 111, rigidly mounted, as by welding, one to each of the guide angles 50 and 52. Angle braces 112, 113 are welded to the top of the structural members 110, 111, respectively, and to the associated guide angle to rigidly retain the structural members in the vertically extending position. A horizontally extending shaft 114 is journaled for rotation about an axis extending substantially transverse to the conveyor paths 64, 66 in vertically spaced relation thereto by bearings 115, 116 mounted one adjacent the top of structural members 110, 111, respectively. A sprocket 117 is fixed on one end of the shaft 114, and one of the conveyer drive chains 44 extends over the sprocket 117 to drive the shaft 114 about its horizontal axis at a rate proportional to the rate of rotation of the roller members 30 of the conveyer segments.

A pair of cylindrical drive sopols 118, 119 are mounted, as by keys 120, on shaft 114 for rotation therewith, with one of the spools being positioned adjacent each of the bearings 115, 116 above the conveyer paths 64. 66, respectively. A plurality of drive wheel mounting brackets 121 are pivotally mounted on shaft 114, with one or two of the mounting brackets 121 being mounted adjacent each of the drive spools 118, as more fully explained hereinbelow. Since the mounting brackets 121 are identical in construction, only one will be described in detail, with identical reference numerals identifying corresponding parts on the remaining brackets. The bracket 121 comprises a pair of arms 122, 123 each having one end pivotally mounted on shaft 114 on opposed sides of the spool 118 and rigidly connected for simultaneous pivotal movement by a rigid U-shaped bar 124 having its opposed ends mounted, as by welding to the respective arms. A shaft 125 extends between the other ends of the arms 122, 123, and a drive wheel 126 is mounted on the shaft 125 for free rotation thereon. Preferably the drive wheel comprises a rim 127 having a resilient pneumatic tire 128 mounted thereon. The length of arms 122, 123 and the diameter of the tire 128 is such that the outer circumference of the tire is in firm frictional contact with the outer circumference of the drive spool 118 so that rotation of the spool with the shaft 114 will frictionally rotate the drive wheel 126 about the axis shaft 125.

The brackets 121 normally extend from shafts 114 in an outwardly and downwardly inclined direction to position the peripheral surface of tire 128 closely above the conveying surface defined by the top portion of the conveyer rollers 30. A rigid stop 129 is provided on the bracket in position to engage the rigid A-frame assembly to limit downward movement of the bracket beyond this extxent. Thus, the drive wheel and bracket assembly are gravity biased toward the conveyer surface, but are free to pivot in an upwardly direction about the axis of the shaft 114.

The infeed conveyer segment 14 is provided with two of the drive bracket assemblies, with one positioned vertically above each of the conveyer paths 64, 66, and with the drive wheels 126 being positioned upstream slightly from the discharge end of the conveyor segment. Each of the intermediate conveyer segments 16 preferably have two of the drive bracket assemblies mounted above each of the conveyer paths, with one of the drive wheels 126 being positioned directly above the first roller element 30 on the upstream end of the conveyer segment, with the other of the drive wheels being spaced upstream slightly from the discharged end of the conveyer segment. The discharge conveyer segment 18 may be provided with a single drive wheel 126 above each of the conveyer paths in vertical alignment with the endmost roller on the upstream end of the discharge conveyer segment.

In this embodiment, a board B being conveyed along the apparatus will pass beneath the resilient tires 126. Since the wheel and bracket assemblies are gravity biased toward the conveyer surface, the board B will be urged downwardly into firm engagement with the driven rollers 30. At the same time, the tires 128 are driven at a linear surface speed corresponding to the surface speed of the rollers 30 so that a positive driving force is imparted to the boards by the hold-down and drive arrangement described.

This embodiment of the invention is particularly useful in conveying and sorting lumber which is not completely straight and which therefore does not tend to lie perfectly flat on the conveying surface. Thus, even if a board is so crooked as to have a portion of its bottom surface pass clear of one of the driven conveyer rollers 30, the board will, nevertheless, be positively driven through the mechanism by the auxiliary hold-down and drive mechanism. Further, while the hold-down mechanism has been described as an auxiliary drive for a driven conveyer, it is believed apparent that it could be employed as the sole means for driving the boards along the conveying surface. In addition, it is believed apparent that the structure could be employed only as a hold-down means to assist in retaining lightweight or crooked boards in firm frictional contact with the driven conveyer rollers 30. In this latter case, the drive means for the auxiliary structure may be eliminated.

While the invention has ben described with reference to an apparatus for sorting lumber, it is believed apparent that it may be equally well adapted to sorting any elongated, generally rectangular articles such as shipping cartons, structural shapes, or the like. Accordingly, while we have described preferred embodiments of our invention, we wish it understood that we do not intend to be restricted solely thereto, but that we do intend to include all embodiments thereof which would be apparent to one skilled in the art and which come within the spirit and scope of our invention.

We claim:

1. An article conveying and sorting apparatus comprising, a plurality of conveyer segments supported in spaced relation to one another to define a longitudinal conveying surface, guide means mounted along one side edge of said conveying surface and extending upwardly therefrom to define a conveyer path along said conveying surface, and support means mounted intermediate said conveyer segments in position to engage and support the bottom surface of an article adjacent the side edge thereof nearest said guide means as the article is conveyed along said conveyer path, the lateral spacing of said support means with respect to said guide means being less than one-half the transverse dimension of the articles to be conveyed and sorted by the apparatus.

2. The article conveying and sorting apparatus defined in claim 1 further comprising means for urging articles conveyed along said conveyer path into engagement with said guide means to longitudinally align the articles with said guide means.

3. The article conveying and sorting apparatus defined in claim 1 further comprising means for driving each of said conveyer segments to convey articles along said conveyer path.

4. The article conveying and sorting apparatus defined in claim 1 wherein said conveyer segments comprise roller members rotatably mounted in a frame, said roller members of the separate conveyer segments cooperating to define said load conveying surface.

5. The article conveying and sorting apparatus defined in claim 4 further comprising means for imparting a rotative force to at least selected ones of said roller members of each said conveyer segment to convey articles along said load conveying surface.

6. The article conveying and sorting apparatus defined in claim 5 wherein said roller members of at least one of said conveyer segments are mounted for rotation about substantially parallel axes inclined in a plane parallel to said load conveying surface with respect to said guide means to urge an article conveyed thereon into engagement with said guide means to longitudinally align the article with said guide means as the article moves along said conveyer path.

7. The article conveying and sorting apparatus defined in claim 1 wherein said support means comprises a plurality of roller elements mounted for rotation about axes extending in a generally transverse direction with respect to said conveying surface, said roller elements extending outwardly from said guide means in the direction of said conveyer path a distance less than one-half the minimum transverse width of the articles to be conveyed along said conveyer path.

8. The article conveying and sorting apparatus defined in claim 1 including at least three of said conveyer segments supported in longitudinal alignment defining said conveying surface, said conveying surface extending from a receiving end to a discharge end with the spacing between successive conveyer segments increasing from said receiving end to said discharge end, the spacing of successive conveyer segments determining the minimum length of an article which may be conveyed therebetween.

9. The article conveying and sorting apparatus defined in claim 1 further comprising an elongated structural member mounted above said conveying surface in closely spaced relation thereto and extending substantially the full length thereof in laterally spaced parallel relation to said guide means, said elongated structural element cooperating with said guide means to divide said conveying surface into two parallel conveying paths the first extending along one side of said guide means and the second extending along one side of said elongated structural member.

10. The article conveying and sorting apparatus defined in claim 9 further comprising second support means mounted intermediate said conveyer segments in spaced relation to said elongated surunctural member in position to engage and support the bottom surface of an article moving on the second conveyer path.

11. The article conveying and sorting apparatus defined in claim 1 further comprising article hold-down means, and mounting means supporting said hold-down above said conveying surface in position to engage an article moving along said conveying surface, said hold-down being biased toward said conveying surface and movable relative thereto to urge articles toward said conveying surface.

12. The article conveying and sorting apparatus defined in claim 11 wherein said hold-down means further comprises a high-friction traction surface for engaging the articles, and means driving said traction surface to move articles in contact therewith along said conveying surface.

13. The article conveying and sorting apparatus defined in claim 11 wherein said hold-down means comprises a drive wheel having a high-friction traction surface for engaging the articles, said mounting means comprising shaft means mounting said drive wheel for rotation about an axis extending above and substantially transverse to said conveyer path, and means for driving said drive wheel about said shaft to move articles in contact with said traction surface along said conveying surface.

14. The article conveying and sorting apparatus defined in claim 13 further comprising means for driving each of said conveyer segments, said drive wheel and the driven conveyer segments cooperating to convey articles along said conveyer path.

15. An apparatus for conveying elongated articles and sorting the articles according to their length, comprising a plurality of conveyer segments supported in longitudinally aligned spaced relation to one another to define an alongated conveyer path with the space between the successive conveyer segments defining a sorting station, drive means for operating said conveyer segments to convey elongated articles longitudinally along said conveyer path, guide means extending substantially the full length of said conveyer path, means mounting said guide means adjacent one side edge of said conveyer path with said guide means extending upwardly therefrom, means for urging an elongated article into engagement with said guide means to align one side edge of the article with said means to align one side edge of the article with said guide means as the article is conveyed along said conveyer path, and support means mounted intermediate said conveyer segments in spaced relation to said guide means in position to engage and support the bottom surface of an article being conveyed along said conveyer path at each said sorting station, the spacing of said support means with respect to said guide means being less than one-half the transverse width of articles to be conveyed and sorted by the apparatus.

16. The apparatus defined in claim 15 wherein said conveyor segments comprise a plurality of roller members rotatably mounted in a frame to define a load conveying surface, said drive means including means for imparting a rotative force to at least selected ones of said roller members of each said conveyor segment.

17. The apparatus defined in claim 16 wherein the rollers of at least selected ones of said conveyor segments are mounted for rotation about substantially parallel axes inclined with respect to said guide means to urge an article conveyed thereon into side-edge engagement with said guide means as the article moves along said conveyor path.

18. The article conveying and sorting apparatus defined in claim 17 including at least three of said conveyer segments supported in longitudinal alignment and defining a conveyer path extending from a receiving end to a discharge end with the spacing between successive conveyor segments increasing from said receiving end to said discharge end, the spacing of successive conveyer segments determining the minimum length of an article which may be conveyed therebetween.

19. The article conveying and sorting apparatus defined in claim 18 further comprising article hold-down and driving means mounted on each of said conveyer segments, said hold-down and driving means comprising a drive wheel having a high-friction traction surface for engaging articles moving along said conveyer path, shaft means mounting said drive wheel for rotation about an axis extending above and substantially transverse to said conveyer path, means for driving said drive wheel about said shaft, and arm means mounting said shaft for movement toward and away from said conveyer path, said arm means and said drive wheel being gravity biased toward said conveyer path to engage an article moving along said path and urge the articles toward said path.

20. The article conveying and sorting apparatus defined in claim 19 wherein said high-friction traction surface comprises a resilient tire mounted on the outer periphery of said drive wheel, and said means for driving said drive wheel comprises a drive cylinder frictionally engaging said drive tire, and means rotating said drive cylinder about an axis substantially parallel to said shaft.

21. The article conveying and sorting apparatus defined in claim 16 wherein said support means comprises a plurality of idler roller members mounted for rotation about axes extending in a generally transverse direction with respect to said conveyor path, said roller members at each said sorting station extending outwardly a predetermined distance from said guide means in said transverse direction, said predetermined distance being less than one-half the width of the articles to be conveyed and sorted by said apparatus.

22. The article conveying and sorting apparatus defined in claim 21 including at least two of said sorting stations, and wherein the idler rollers at one of said sorting stations extends outwardly from said guide means a distance greater than the rollers at another of said sorting stations.

23. The article conveying and sorting apparatus defined in claim 15 further comprising bottom support means mounted intermediate said conveyor segments in laterally spaced relation with respect to said support means and said guide, said bottom support means being positioned to engage and support the bottom surface of an article of greater than a predetermined width as the article moves past the respective sorter stations along said conveyor path, the lateral spacing of said bottom support means with respect to said guide determining the maximum width of an article which can be sorted out at the sorter station.

24. The article conveying and sorting apparatus defined in claim 15 further comprising article hold-down means, and mounting means supporting said hold-down above said conveying surface in position to engage an article moving along said conveying surface, said hold-down being biased toward said conveying means and movable relative thereto to urge articles toward said conveying surface.

25. The method of sorting elongated articles according to length comprising the steps of conveying the articles lengthwise along a conveyer path defined by a plurality of longitudinally spaced conveyer segments, and supporting the bottom surface of the articles adjacent one side edge thereof only between successive conveyer segments to permit articles having a length less than the longitudinal spacing of said successive conveyer segments to fall therebetween.

26. The method defined in claim 25 comprising the further step of urging one side surface of the articles to be sorted into engagement with an elongated guide element as the articles are conveyed along said conveyer path, said one side surface being substantially contiguous with said one side edge.

References Cited

UNITED STATES PATENTS

| 3,455,445 | 7/1969 | Allen | 209—97 X |
| 3,467,253 | 9/1969 | Rossi | 209—82 X |

RICHARD A. SCHACHER, Primary Examiner

U.S. Cl. X.R.

209—83, 97